(12) United States Patent
Hanna et al.

(10) Patent No.: US 10,996,095 B2
(45) Date of Patent: May 4, 2021

(54) DIELECTRIC-CONSTANT-INSENSITIVE FLUID LEVEL SENSOR

(71) Applicant: SENSATA TECHNOLOGIES, INC., Attleboro, MA (US)

(72) Inventors: Tyler S. Hanna, Sutton, MA (US); Harshad V. Tadas, Franklin, MA (US); Andrew Legendre, Dedham, MA (US); Nikita Gubanov, Attleboro, MA (US)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 379 days.

(21) Appl. No.: 16/043,749

(22) Filed: Jul. 24, 2018

(65) Prior Publication Data
US 2020/0033178 A1  Jan. 30, 2020

(51) Int. Cl.
*G01F 23/26* (2006.01)
*G01F 23/00* (2006.01)
*G01F 23/04* (2006.01)

(52) U.S. Cl.
CPC .......... *G01F 23/268* (2013.01); *G01F 23/265* (2013.01); *G01F 23/266* (2013.01); *G01F 23/0046* (2013.01); *G01F 23/04* (2013.01); *G01F 23/261* (2013.01); *G01F 23/263* (2013.01)

(58) Field of Classification Search
CPC .... G01F 23/268; G01F 23/265; G01F 23/266; G01F 23/04; G01F 23/0046; G01F 23/263
See application file for complete search history.

(56) References Cited

U.S. PATENT DOCUMENTS

| 3,827,300 A | 8/1974 | Thaler |
| 3,918,306 A | 11/1975 | Maltby |
| 4,201,085 A | 5/1980 | Larson |
| 4,208,909 A | 6/1980 | Maltby |
| 4,603,581 A | 8/1986 | Yamanoue et al. |
| 4,782,698 A | 11/1988 | Wilson |
| 4,806,847 A | 2/1989 | Atherton et al. |
| 5,005,407 A | 4/1991 | Koon |
| 5,050,431 A | 9/1991 | McDonald |
| 5,103,368 A | 4/1992 | Hart |
| 5,182,545 A | 1/1993 | Goekler et al. |

(Continued)

FOREIGN PATENT DOCUMENTS

| DE | 102005007221 A1 | 9/2006 |
| EP | 3599447 A1 | 1/2020 |

(Continued)

*Primary Examiner* — Herbert K Roberts
*Assistant Examiner* — John M Royston

(57) ABSTRACT

A dielectric-constant-insensitive fluid level sensor for directly inserting into a high dielectric constant fluid is disclosed. According to one embodiment, the fluid level sensor includes a first set of stacked series capacitors where each capacitor in the first set is formed by two coplanar electrodes and a dielectric space between the electrodes. Each stack of series capacitors in the first set includes at least one capacitor having a first molded carrier as the dielectric space in series with another capacitor having a first fluid cavity as the dielectric space. In this embodiment, the total capacitance of the first set of stacked series capacitors varies as a function of the level of the fluid within the first fluid cavity.

19 Claims, 9 Drawing Sheets

(56) References Cited

U.S. PATENT DOCUMENTS

| | | |
|---|---|---|
| 5,227,174 A | 7/1993 | König |
| 5,423,214 A | 6/1995 | Lee |
| 5,627,523 A | 5/1997 | Besprozvanny et al. |
| 5,900,810 A | 5/1999 | Park et al. |
| 5,929,754 A | 7/1999 | Park et al. |
| 6,016,697 A * | 1/2000 | McCulloch ........... G01F 23/266 73/304 C |
| 6,164,132 A | 12/2000 | Matulek |
| 6,297,733 B1 | 10/2001 | Park |
| 6,443,006 B1 | 9/2002 | Degrave |
| 6,490,920 B1 | 12/2002 | Netzer |
| 7,258,005 B2 | 8/2007 | Nyce |
| 2002/0008526 A1 | 1/2002 | Martin et al. |
| 2007/0240506 A1 | 10/2007 | Lin |
| 2009/0301190 A1 | 12/2009 | Ross, Jr. et al. |

FOREIGN PATENT DOCUMENTS

| | | |
|---|---|---|
| JP | 2006214997 A | 8/2006 |
| KR | 20130095869 A | 8/2013 |

* cited by examiner

Table 202

| Level (mm) | C1 (pF) | C2 (pF) | C3 (min) (pF) | C3 (max) (pF) | C4 (pF) | C5 (pF) | C6 (pF) |
|---|---|---|---|---|---|---|---|
| 0 | 0.0000 | 4.0480 | 0.0000 | 0.0000 | 1.0120 | 0.0000 | 4.0480 |
| 10 | 0.3373 | 3.7107 | 4.2167 | 5.9034 | 0.9277 | 0.3373 | 3.7107 |
| 20 | 0.6747 | 3.3734 | 8.4334 | 11.8068 | 0.8433 | 0.6747 | 3.3734 |
| 30 | 1.0120 | 3.0360 | 12.6502 | 17.7102 | 0.7590 | 1.0120 | 3.0360 |
| 40 | 1.3493 | 2.6987 | 16.8669 | 23.6136 | 0.6747 | 1.3493 | 2.6987 |
| 50 | 1.6867 | 2.3614 | 21.0836 | 29.5170 | 0.5903 | 1.6867 | 2.3614 |
| 60 | 2.0240 | 2.0240 | 25.3003 | 35.4204 | 0.5060 | 2.0240 | 2.0240 |
| 70 | 2.3614 | 1.6867 | 29.5170 | 41.3238 | 0.4217 | 2.3614 | 1.6867 |
| 80 | 2.6987 | 1.3493 | 33.7337 | 47.2272 | 0.3373 | 2.6987 | 1.3493 |
| 90 | 3.0360 | 1.0120 | 37.9505 | 53.1306 | 0.2530 | 3.0360 | 1.0120 |
| 100 | 3.3734 | 0.6747 | 42.1672 | 59.0340 | 0.1687 | 3.3734 | 0.6747 |
| 110 | 3.7107 | 0.3373 | 46.3839 | 64.9374 | 0.0843 | 3.7107 | 0.3373 |
| 120 | 4.0480 | 0.0000 | 50.6006 | 70.8409 | 0.0000 | 4.0480 | 0.0000 |

FIG. 2

Table 302

| Fluid 1 (k=60) | | Fluid 2 (k=80) | |
|---|---|---|---|
| Level (mm) | Total Capacitance (pF) | Level (mm) | Total Capacitance (pF) |
| 0 | 0.6747 | 0 | 0.6747 |
| 10 | 0.7806 | 10 | 0.7824 |
| 20 | 0.8866 | 20 | 0.8902 |
| 30 | 0.9926 | 30 | 0.9980 |
| 40 | 1.0985 | 40 | 1.1057 |
| 50 | 1.2045 | 50 | 1.2135 |
| 60 | 1.3104 | 60 | 1.3212 |
| 70 | 1.4164 | 70 | 1.4290 |
| 80 | 1.5223 | 80 | 1.5368 |
| 90 | 1.6283 | 90 | 1.6445 |
| 100 | 1.7343 | 100 | 1.7523 |
| 110 | 1.8402 | 110 | 1.8600 |
| 120 | 1.9462 | 120 | 1.9678 |

Graph 304

DIELECTRIC-CONSTANT-INSENSITIVE FLUID LEVEL SENSOR

FIELD OF THE INVENTION

The present disclosure relates to fluid level sensors for directly inserting into a high dielectric constant fluid.

BACKGROUND OF THE INVENTION

There are various known methods to measuring the level of a fluid within a fluid container. In one method, a sensor utilizes capacitive plates, which interacting with the fluid, are excited with an alternating voltage to generate a signal current that varies based on the fluid level. In the most basic version of this design, the sensor is configured to measure a fluid of a specific dielectric constant. To adjust for the situation in which the dielectric constant of a fluid is unknown, most capacitive level sensors utilize a reference capacitor to compensate for different dielectric constants of different fluid mixtures. In these compensated capacitive level sensors, the reference capacitor is at the bottom of the fluid container and must be totally submerged in the fluid to compensate for variations in the dielectric constant. The disadvantage to using a reference capacitor is that, because the reference capacitor must be totally immersed in the fluid, an erroneous output is obtained for fluid levels lower than the reference capacitor height. Also, because the reference capacitor is required to be located at the bottom of the fluid container, the reference capacitor is sensitive to non-homogenous fluid mixtures at the bottom of the container, in which case, the measured dielectric constant is not representative of the intended fluid.

SUMMARY OF THE INVENTION

According to one embodiment, a dielectric-constant-insensitive fluid level sensor for directly inserting into a high dielectric constant fluid is disclosed. The fluid level sensor includes a first set of stacked series capacitors where each capacitor in the first set is formed by two coplanar electrodes and a dielectric space between the electrodes. Each stack of series capacitors in the first set includes at least one capacitor having a first molded carrier as the dielectric space in series with another capacitor having a first fluid cavity as the dielectric space. The total capacitance of the first set of stacked series capacitors varies as a function of the level of the fluid within the first fluid cavity. In this embodiment, if fluids with high dielectric constants are measured, then variations in the dielectric constant of the fluid has a minor impact on the total capacitance of the capacitor stack and thus, the total capacitance of the sensor, relative to the impact of the dielectric constant of any air within the fluid cavity. The resulting dielectric-constant-insensitive fluid level sensor has the advantage that prior knowledge of the fluid, the level of which is to be sensed, is not required.

According to another embodiment, a dielectric-constant-insensitive sensor for directly inserting into a high dielectric constant fluid is disclosed. The fluid level sensor includes a first set of stacked series capacitors where each capacitor in the first set is formed by a metallic shield, a first electrode, and one of a first plurality of dielectric spaces between the first electrode and the metallic shield. Each stack of series capacitors in the first set includes at least one capacitor having a first fluid cavity as the dielectric space and another capacitor having as the dielectric space, one or more molded carriers encased by the metallic shield. In this embodiment, the fluid level sensor includes a second set of stacked series capacitors. Each capacitor in the second set formed by the metallic shield, a second electrode, and one of a second plurality of dielectric spaces between the second electrode and the metallic shield. Each stack of series capacitors in the second set includes at least one capacitor having the first fluid cavity as the dielectric space and another capacitor having as the dielectric space, the one or more molded carriers encased by the metallic shield. In this embodiment, the total capacitance of the first stack of series capacitors and the total capacitance of the second stack of series capacitors both vary as a function of the level of the fluid within the first fluid cavity. Because the capacitors in the sensor are in series, the impact of the changes to the dielectric constant of a fluid in one of the capacitors is minimized. The resulting dielectric-constant-insensitive fluid level sensor has the advantage that prior knowledge of the fluid, the level of which is to be sensed, is not required.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

So that those having ordinary skill in the art to which the disclosed technology appertains will more readily understand how to make and use the same, reference may be had to the following drawings.

FIG. 2 depicts a table illustrating the capacitance of various capacitors within the fluid level sensor of FIG. 1, according to one embodiment of the present disclosure.

DETAILED DESCRIPTION

Figure 1:
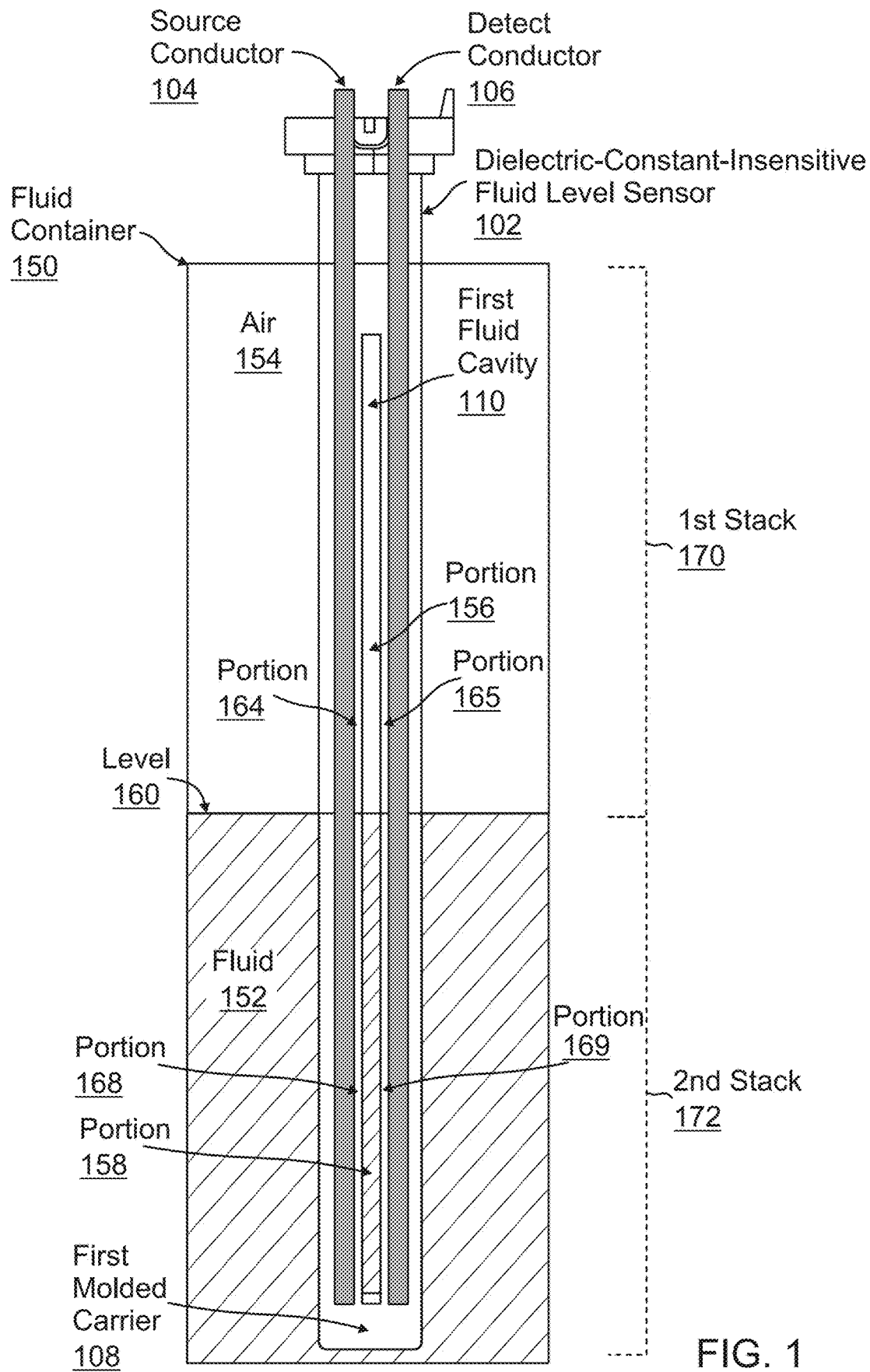
FIG. 1 depicts a side cross-section view of a dielectric-constant-insensitive fluid level sensor, according to one embodiment of the present disclosure.

The present disclosure describes a fluid level sensor, which is insensitive to the dielectric constant of a high dielectric constant fluid, the level of which is to be sensed. The resulting dielectric-constant-insensitive fluid level sensor has the advantage that prior knowledge of the high dielectric constant fluid, the level of which is to be sensed, is not required.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words defining orientation such as "upper", and "lower" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always be on top).

FIG. 1 illustrates a side cross-sectional view of a dielectric-constant-insensitive fluid level sensor (102), according to one embodiment of the present disclosure. As illustrated and further described herein, the dielectric-constant-insensitive fluid level sensor (102) depicted in FIG. 1 is inserted directly into a high dielectric constant fluid (152) within a fluid container (150). For ease of explanation, throughout the disclosure, the dielectric-constant-insensitive fluid level sensor (102) is referred to as a fluid level sensor and the high dielectric constant fluid (152) is referred to as the fluid. The fluid level sensor (102) is configured to measure a level (160) of the fluid (152) within the fluid container (150). In a particular embodiment, a high dielectric constant fluid is any fluid having a dielectric constant greater than or equal to 35. Readers of skill in the art will realize that defining a 'high dielectric constant' as 35 or greater is an example and that fluids with lower dielectric constants can still be considered a 'high' dielectric constant according to embodiments of the present disclosure.

The fluid level sensor (102) includes two coplanar electrodes: a source electrode (104) and a detect electrode (106). The two coplanar electrodes (104, 106) are encased within a first molded carrier (108) and separated from one another by some portion of the first molded carrier (108). In a particular embodiment, a portion of the first molded carrier (108) between the two electrodes (104, 106) has a known dielectric constant value thereby forming with the two electrodes, a first set of one or more capacitors of fixed electrical capacitive values. For example, the first molded carrier (108) may be formed with a material having a relatively low dielectric constant value, such as plastic. In a particular embodiment, the source electrode (104) and the detect electrode (106) are insert molded into the first molded carrier (108).

The fluid level sensor (102) also includes a first fluid cavity (110) that is encased in the portion of the first molded carrier between the two electrodes (104, 106). The first fluid cavity (110) is open to receiving varying levels of the fluid (152) within the fluid container (150). In a particular embodiment, the fluid level sensor (102) is used to measure the level of washer fluid, a commodity fluid with varying amounts of methanol, ethylene glycol, propylene glycol, isopropyl alcohol, detergent, and/or water. The first fluid cavity (110) forms with the two electrodes (104, 106) and the fluid (152) and any air (154) within the first fluid cavity (110), a second set of one or more capacitors of variable electrical capacitive values.

For example, a first capacitor may be formed by the source electrode (104), the detect electrode (106), and the portion (168) of the first molded carrier (108) that is at or below the level (160) of fluid within the fluid container (150) and to the left of the fluid cavity (110). Continuing with this example, a second capacitor may be formed by the source electrode (104), the detect electrode (106), and the dielectric space of the portion (164) of the first molded carrier (108) that above the level (160) and to the left of the fluid cavity (110). Furthermore, a third capacitor may be formed by the source electrode (104), the detect electrode (106), and the fluid (152) within the portion (158) of the fluid cavity (110) that is at or below the level (160) of the fluid (152) of the fluid container (150). Continuing with this example, a fourth capacitor may be formed by the source electrode (104), the detect electrode (106), the air (154) within the portion (156) of the fluid cavity (110) above the level (160) of the fluid (152) in the fluid container (150). Additionally, a fifth capacitor may be formed by the source electrode (104), the detect electrode (106), and the portion (169) of the first molded carrier (108) that is at or below the level (160) and to the right of the fluid cavity (110). Finally, a sixth capacitor may be formed by the source electrode (104), the detect electrode (106), and the dielectric space of the portion (164) of the first molded carrier (108) that is above the level (160) and to the right of the fluid cavity (110).

For purposes of calculating equivalent capacitance of the various capacitors described above, the capacitors may be grouped into stacks of capacitors. For example, a first stack (170) may include the second capacitor, the fourth capacitor, and the sixth capacitor that are formed by the source electrode (104), the detect electrode (106), and the dielectric spaces of the portions of the fluid cavity (110) and the first molded carrier (108) that are above the level (160) of the fluid (152) in the fluid container (150). Continuing with this example, a second stack (172) may include the first capacitor, the third capacitor, and the fifth capacitor that are formed by the source electrode (104), the detect electrode (106), and the dielectric spaces of the portions of the fluid cavity (110) and the first molded carrier (108) that are at or below the level (160) of the fluid (152) in the fluid container (150). In this example, all the capacitors in a particular stack are in series with each other and for purposes of calculating equivalent capacitance are added as such. Because the two stacks of series capacitors are on top of each other, each stack of series capacitors is in parallel with the series capacitors in the other stack and for purposes of calculating equivalent capacitance are added as such.

For example, the total equivalent capacitance of the above described set of stacked series capacitors may be calculated in accordance with the below equations:

$$C_{total} = \left(\frac{1}{C1} + \frac{1}{C3} + \frac{1}{C5}\right)^{-1} + \left(\frac{1}{C2} + \frac{1}{C4} + \frac{1}{C6}\right)^{-1},$$

where $C_1$, $C_2$, $C_3$, $C_4$, $C_5$, and $C_6$, are the above mentioned first, second, third, fourth, fifth, and sixth capacitors, respectively, where $$C_1 = \frac{k(\text{portion } 168) * \varepsilon 0 * (\text{width of electrodes } (104, 106) * \text{height of fluid in fluid cavity } (110))}{\text{distance between electrodes } (104, 106), \text{ of left portion } (168) \text{ of carrier } (108)};$$

$$C_2 = \frac{k(\text{portion } 164) * \varepsilon 0 * (\text{width of electrodes } (104, 106) * \text{height of air in fluid cavity } (110))}{\text{distance between electrodes } (104, 106), \text{ of left portion } (164) \text{ of carrier } (108)};$$

-continued $$C_3 = \frac{k(\text{portion } 158) * \varepsilon 0 * (\text{width of electrodes } (104, 106) * \text{height of fluid in fluid cavity } (110))}{\text{distance between electrodes } (104, 106), \text{ of portion } (158) \text{ of fluid cavity } (110)};$$

$$C_4 = \frac{k(\text{portion } 156) * \varepsilon 0 * (\text{width of electrodes } (104, 106) * \text{height of air in fluid cavity } (110))}{\text{distance between electrodes } (104, 106), \text{ of portion } (156) \text{ of fluid cavity } (110)};$$

$$C_5 = \frac{k(\text{portion } 169) * \varepsilon 0 * (\text{width of electrodes } (104, 106) * \text{height of fluid in fluid cavity } (110))}{\text{distance between electrodes } (104, 106), \text{ of right portion } (168) \text{ of carrier } (108)}; \text{ and}$$

$$C_6 = \frac{k(\text{portion } 165) * \varepsilon 0 * (\text{width of electrodes } (104, 106) * \text{height of air in fluid cavity } (110))}{\text{distance between electrodes } (104, 106), \text{ of right portion } (164) \text{ of carrier } (108)}.$$

As shown in the above equations, because the third capacitor ($C_3$) with the fluid cavity as the dielectric space is in series with the two capacitors (i.e., the first capacitor ($C_1$) and the fifth capacitor ($C_5$)) with the first molded carrier as the dielectric space, the multiplicative inverse of the dielectric constant (k(portion 158)) of the third capacitor is used in the addition of the total capacitance for the second stack (172). Likewise, the multiplicative inverse of the dielectric constant (k(portion 156)) of the fourth capacitor is used in the addition of the total capacitance for the first stack (170).

If fluids with high dielectric constants are measured in the above fluid level sensor (102), then the difference between the multiplicative inverse of the dielectric constant of a first high dielectric constant fluid and the multiplicative inverse of the dielectric constant of a second high dielectric constant fluid is relatively minor compared to the multiplicative inverse of the dielectric constant of air. For example, where the first fluid has a dielectric constant of 60 and the second fluid has a dielectric constant of 80, the difference between the multiplicative inverses of those dielectric constants, (i.e., ⅟60 and ⅟80) is relatively minor compared to the multiplicative inverse of the dielectric constant of air (1/1). The result is that the fluid level sensor (102) of FIG. 1 is insensitive to the dielectric constant of the fluid to be sensed and has the advantage that prior knowledge of the fluid and its dielectric constant is not required. This configuration also enables the fluid level sensor (102) to accurately measure the level (160) of the fluid (152) without using a reference capacitor.

Figure 3:
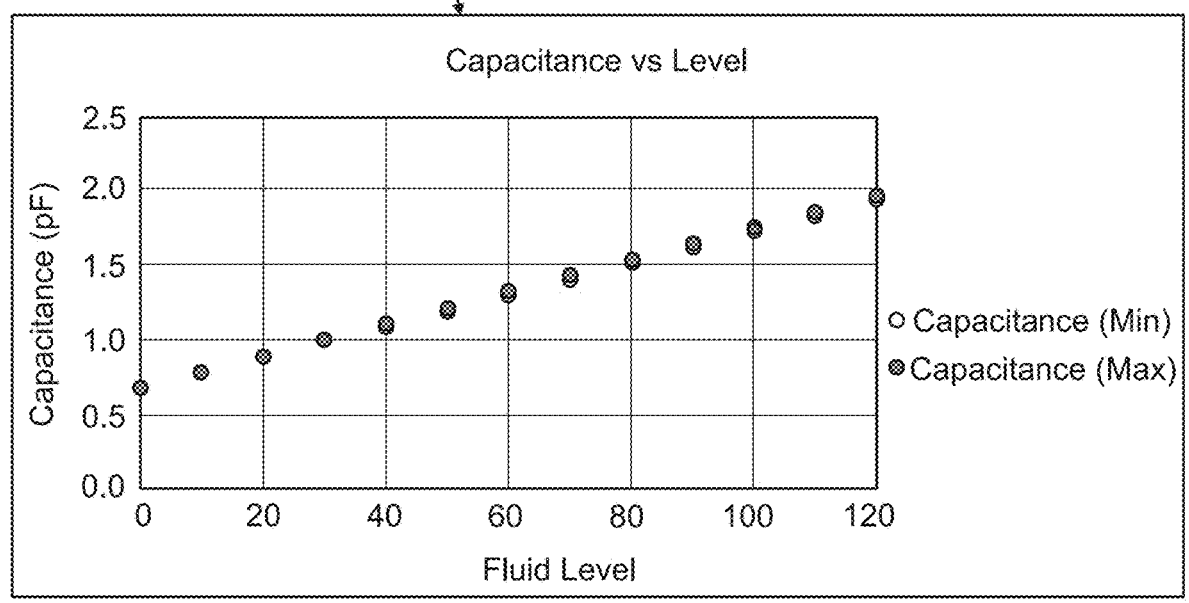
FIG. 3 depicts a table and graph illustrating the total capacitance of the fluid level sensor of FIG. 1 at various fluid levels within the fluid cavity.

To illustrate, FIG. 2 and FIG. 3 together provide an example that illustrates the impact of different fluids with different dielectrics on the fluid level sensor (102) described above. In the example of FIG. 2 and FIG. 3, the capacitance of the capacitors within the fluid level sensor (102) of FIG. 1 is calculated using a first fluid having a dielectric constant of 60 and a second fluid having a dielectric constant of 80. To calculate the individual capacitance of the capacitors within the fluid level sensor (102) of FIG. 1, the following inputs are provided into the equations recited above in the description of FIG. 1:

Inputs: k(carrier)=2.4;

k(first fluid with first dielectric)=60;

k(secondfluid with second dielectric)=80;

$\varepsilon 0$ (permittivity)=8.854e$^{-12}$ distance between electrodes, of left carrier portion (168)=1.5 mm distance between electrodes, of right carrier portion (169)=1.5 mm distance between electrodes, of portion (158, 156) fluid cavity=2.5 mm width of electrodes=2.38 mm total height of fluid cavity (110)=120 mm FIG. 2 depicts a table (202) that lists the capacitances of the first capacitor ($C_1$), the second capacitor ($C_2$), the third capacitor ($C_3$), the fourth capacitor ($C_4$), the fifth capacitor ($C_5$), and the sixth capacitor ($C_6$), with the above inputs and FIG. 3 depicts a table (302) and a graph (304) specifying the total capacitance of the fluid level sensor (102) in accordance with the above provided inputs at various fluid levels within the first fluid cavity (110).

In the example of FIG. 2, the table (202) has a listing of capacitance of the third capacitor, which is formed by the dielectric space of the fluid (152) within the fluid cavity (110), with the first fluid within the fluid cavity (110) and with the second fluid within the fluid cavity (110). At the maximum level of 120 mm, the third capacitor has a capacitance of 50.6006 pF with the first fluid filling the fluid cavity and a capacitance of 70.8409 pF with the second fluid filling the first fluid cavity (110). As shown in the equations above, the capacitors in the second stack (172) are added in series, which includes taking the multiplicative inverse of the capacitance of the third capacitor and adding it to the sum of the multiplicative inverse of the capacitance of the first capacitor and the multiplicative inverse of the capacitance of the fifth capacitor. In this example, the multiplicative inverse of the capacitance of the third capacitor is 0.0198 1/pF for the first fluid and 0.0141 1/pF for the second fluid. The difference between the multiplicative inverses of the two capacitances of the third capacitor at 120 mm is 0.0057. Continuing with this example, the sum of the multiplicative inverse of the capacitance of the first capacitor and the multiplicative inverse of the capacitance of the fifth capacitor is 0.4941. Adding the multiplicative inverse of the capacitance of the third capacitor to the sum of the multiplicative inverse of the first capacitor and the multiplicative inverse of the fifth capacitor results in 0.5111, plus or minus 0.00285 depending on whether the first fluid or the second fluid is in the first fluid cavity (110). Plus, or minus 0.00285 on 0.5111 is a deviation of 0.557%. That is, the difference between the two different dielectric constants of the two fluids only had an impact of 0.557% on the total capacitance of the first stack of series capacitors.

In the table (302) and the graph (304) of FIG. 3, the total capacitance of the fluid level sensor for the different fluids is listed. For example, as shown in the table (302) of FIG. 3, with the level of the fluid in the fluid cavity at 120 mm, the total capacitance of the sensor is 1.9462 pF using the first fluid having a dielectric constant of 60 and the total capacitance of the sensor is 1.9678 pF using the second fluid having a dielectric constant of 80. The difference between the two total capacitances with the fluid level at 120 mm is 0.0216 pF. Furthermore, the difference between the total capacitance with the fluid level at 120 mm and with the fluid level at 0 mm is 1.2715 for the first fluid. Therefore, the difference between the total capacitance with the fluid level at 120 mm and with the fluid level at 0 mm is 1.2823 plus or minus 0.0108 depending on whether the first fluid or the second fluid is in the first fluid cavity (110). Plus, or minus 0.0108 on 1.2823 pF is a deviation of 0.84% on the total capacitance of the fluid level sensor (102) of FIG. 1.

In this example, error due to a delta of twenty dielectric constant between the two fluids is minimized to less than plus or minus 0.84%. The table (302) and the graph (304) of FIG. 3 illustrate that even though the third capacitor ($C_3$) will be directly impacted by dielectric variations between the fluids, the total net capacitance of the fluid level sensor (102) of FIG. 1 can largely remain unaffected. The series capacitor arrangement of the fluid level sensor (102) helps to mitigate offset errors associated with various blends of fluids that could be used in a fluid container.

For example, in a washer fluid container, each mixture of washing fluid may result in a different dielectric constant. As explained above, the fluid level sensor (102) of FIG. 1 is insensitive to the dielectric constant of the fluid to be sensed and therefore in this example, the fluid level sensor (102) of FIG. 1 could provide accurate readings corresponding to the level of an unknown mixture of washer fluid within a washer fluid container.

Figure 4:
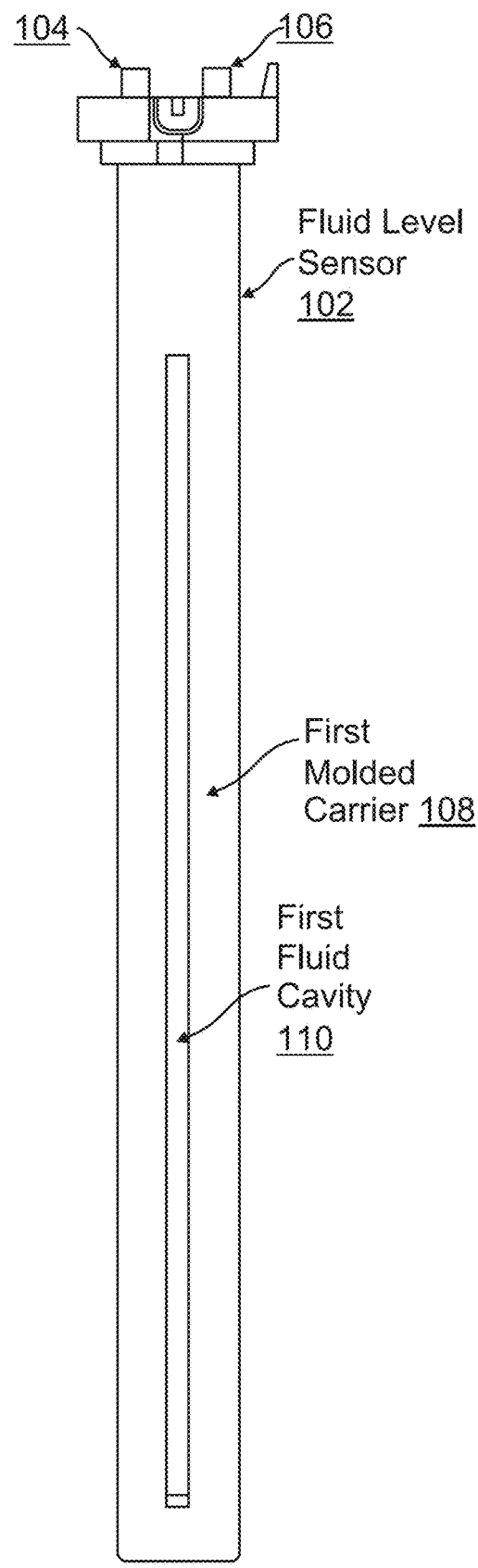
FIG. 4 depicts a side view of the fluid level sensor depicted in FIG. 1.

FIG. 4 depicts a side view of the fluid level sensor illustrated in FIG. 1. In contrast to the cross-sectional view of the fluid level sensor (102) of FIG. 1 where the entire length of the source electrode (104) and the detect electrode (106) is visible, in the example of FIG. 4, the source electrode (104) and the detect electrode (106) are shown as completely encased by the first molded carrier (108) except for the portions of the electrodes (104, 106) that extend out of the fluid level sensor (102).

The first fluid cavity (110) is also encased in the first molded carrier (108) between the two electrodes except for one particular facet of the first fluid cavity (110) that is substantially perpendicular to the level of the fluid in the fluid container upon the placement of the fluid level sensor (102) within the fluid container (150). In the example of FIG. 4, this one particular facet of the first fluid cavity (110) is exposed to the outside of the first molded carrier (108). In a particular embodiment, some portion of the surface of the first molded carrier (108) is flat except for a cavity created in the surface of the first molded carrier (108) that forms the first fluid cavity (110). This one particular facet of the first fluid cavity (110) is open to receiving varying levels of the fluid (152) within the fluid container (150).

Figure 5:
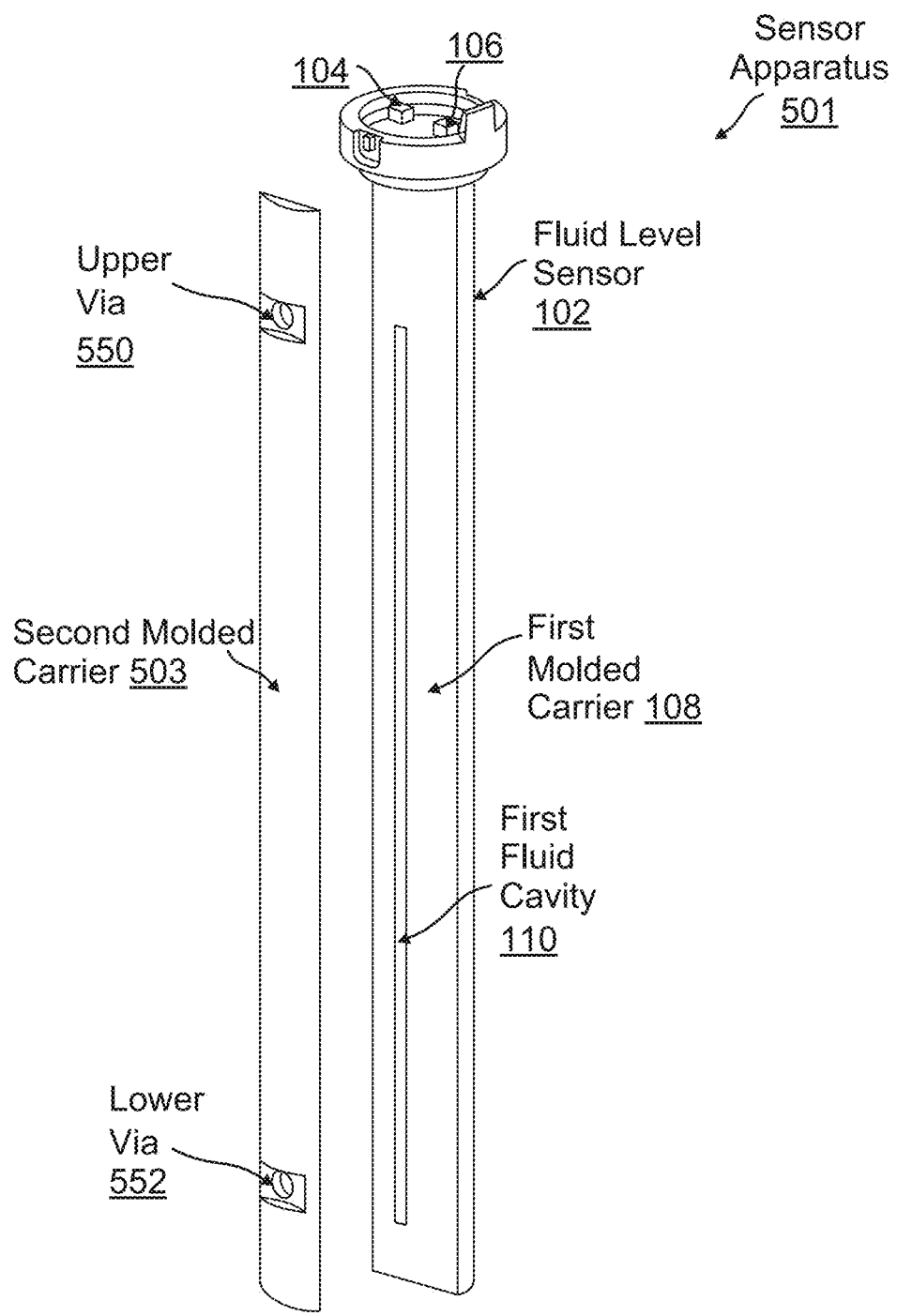
FIG. 5 depicts an isometric view of a sensor apparatus according to one embodiment of the present disclosure.

FIG. 5 depicts an isometric view of a sensor apparatus (501) according to one embodiment of the present disclosure. The sensor apparatus (501) includes the fluid level sensor (102) described in FIG. 1. In addition, the sensor apparatus (501) also includes a second molded carrier (503) that forms a cover for the first molded carrier (108).

As explained in FIG. 4, in one particular embodiment, some portion of the surface of the first molded carrier (108) is flat except for a cavity created in the surface of the first molded carrier (108) that forms the first fluid cavity (110). In the example of FIG. 5, the portion of the first molded carrier (108) that faces the second molded carrier (503) is flat except for the first fluid cavity (110). In this example, the portion of the second molded carrier (503) that faces the first molded carrier (108) is also flat. In a particular embodiment, the above described two flat surfaces of the first molded carrier (108) and the second molded carrier (503) can be assembled together such that the second molded carrier (503) covers the first fluid cavity (110). As explained above, the first fluid cavity (110) is configured to receive varying levels of fluid within the fluid container (150). In the example of FIG. 5, the second molded carrier (503) includes an upper via (550) and a lower via (552) that each create a hole through the second molded carrier (503). When the second molded carrier (503) is covering the first molded carrier (108), the upper via (550) and the lower via (552) act as conduits for the air (154) and the fluid (152) to pass to the first fluid cavity (110) through the second molded carrier (503).

Figure 6:
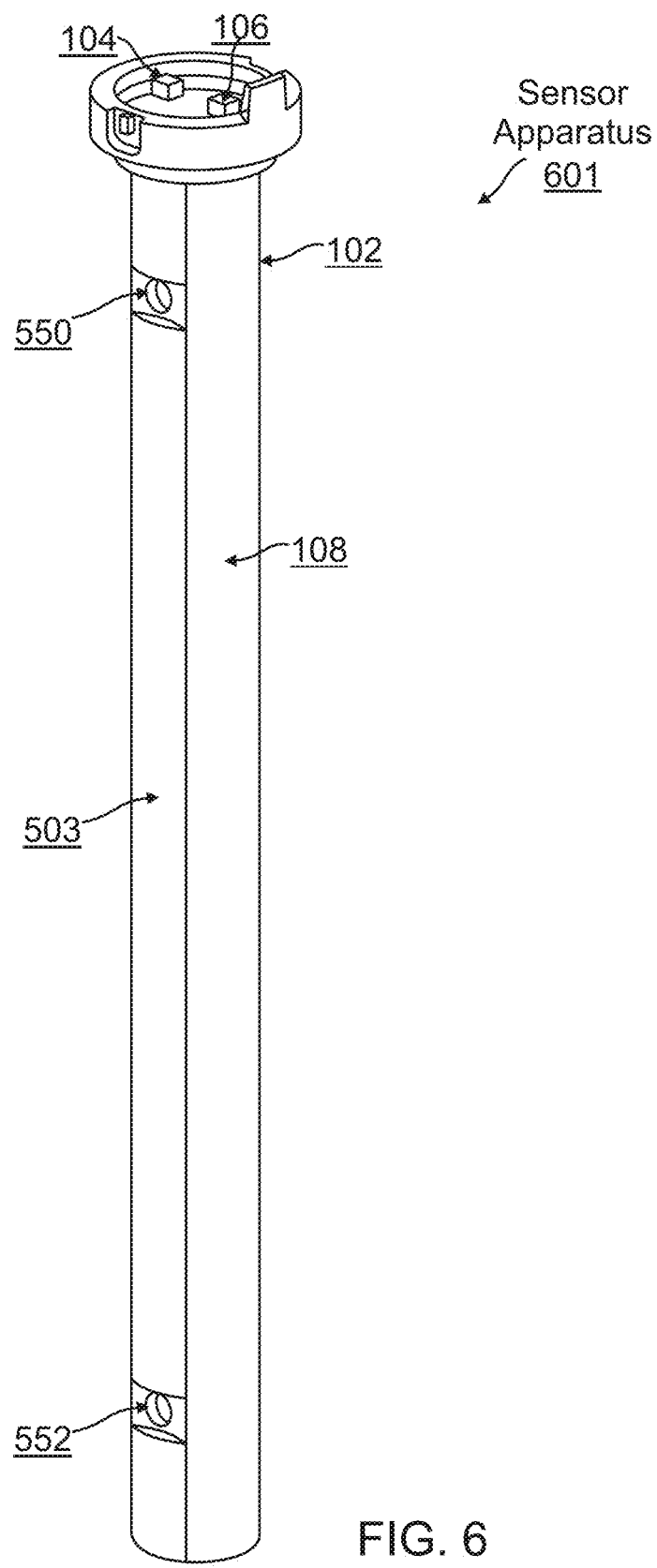
FIG. 6 depicts an isometric view of a sensor apparatus according to one embodiment of the present disclosure.

FIG. 6 depicts an isometric view of a sensor apparatus (601) according to one embodiment of the present disclosure. The sensor apparatus (603) of FIG. 6 includes the second molded carrier (503) in a configuration that covers the facet of the first molded carrier that includes the first fluid cavity (110). As explained in FIG. 5, the upper via (550) and the lower via (552) act as conduits for the air (154) and the fluid (152) to pass to the first fluid cavity (110) through the second molded carrier (503).

Figure 7:
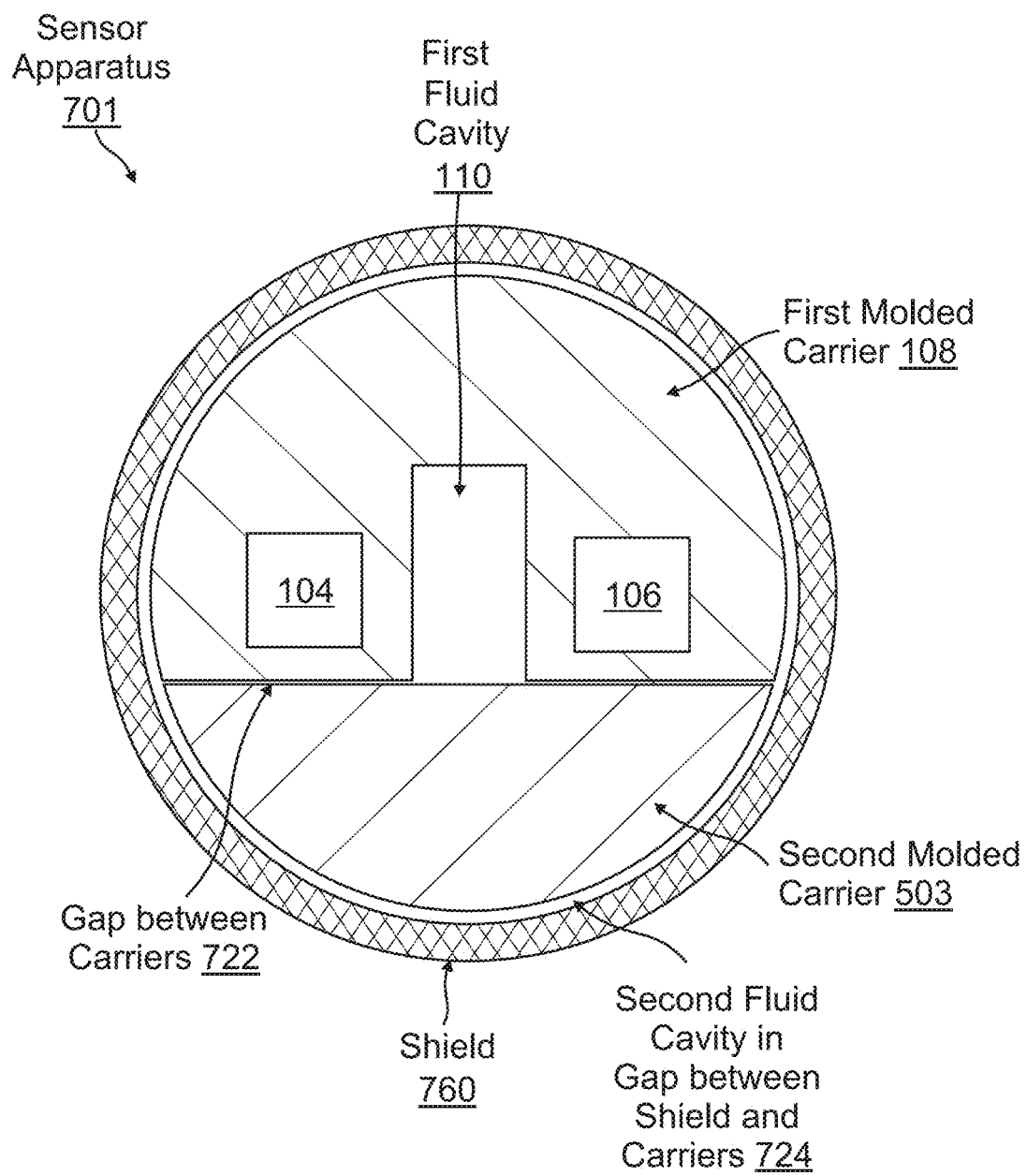
FIG. 7 depicts a top cross-sectional view of a sensor apparatus according to one embodiment of the present disclosure.

FIG. 7 depicts a top cross-sectional view of a sensor apparatus (701) according to one embodiment of the present disclosure. The sensor apparatus (701) is a configuration in which the second molded carrier (503) is covering the surface of the first molded carrier (108) that includes the first fluid cavity (110). In the example of FIG. 7, there is a small gap (722) between the first molded carrier (108) and the second molded carrier (503). Alternative configurations may include a larger or smaller gap, or even no gap at all between the two molded carriers.

The sensor apparatus (701) of FIG. 7 also includes a metallic shield (760) that surrounds the first molded carrier (108) and the second molded carrier (503). In a particular embodiment, the metallic shield (760) reduces interference with the capacitors between the two electrodes (104, 106) from outside the metallic shield (760). Because the shield (760) is metallic, stray capacitance between the electrodes (104, 106) and the shield is a concern, as this stray capacitance could impact the capacitance between the two electrodes (104, 106). To reduce this stray capacitance to the shield (760), the area outside the space between the two electrodes (104, 106) is completely encased in the second molded carrier (503). In the example of FIG. 7, the second molded carrier (503) and the portion of the first molded carrier (108) outside of the space between the two electrodes (104, 106) act as a dielectric space between each electrode (104, 106) and the shield (760).

In a particular embodiment, the first molded carrier (108) and the second molded carrier (503) have a known dielectric constant value thereby forming, for each electrode (104, 106), along with the shield (760), a first set of one or more capacitors of fixed electrical capacitive values. For example, the first molded carrier (108) and the second molded carrier (503) may be formed with a material having a relatively low dielectric constant value, such as plastic.

In the example of FIG. 7, the sensor apparatus (701) includes a second fluid cavity (724) in the gap between the shield (760) and the two electrodes (104, 106). In this example, the second fluid cavity (724) connects with the above-mentioned gap (722) between the first molded carrier (108) and the second molded carrier (503). Alternative configurations may include a larger or smaller gap, or even no gap at all between the shield (760) and the two molded carriers (108, 503).

The second fluid cavity (724) is open to receiving varying levels of the fluid (152) within the fluid container (150) thereby forming for each electrode (104, 106) along with the shield (760) and the fluid (152) and any air (154) within the second fluid cavity (724), a second set of one or more capacitors of variable electrical capacitive values.

For example, one or more capacitors may be formed by the source electrode (104), the shield (760), and the dielectric space of the portion of the first molded carrier (108) that is above the level (160) of the fluid (152) in the fluid container (150). Continuing with this example, one or more capacitors may also be formed by the source electrode (104), the shield (760), and the dielectric space of the portion of the second molded carrier (503) that is above the level (160) of the fluid (152) in the fluid container (150). In addition, one or more capacitors may be formed by the source electrode (104), the shield (760), and the dielectric space of the air (154) in the second fluid cavity (724). In this example, one or more capacitors may be formed by the source electrode (104), the shield (760), and the dielectric space of the portion of the first molded carrier (108) that is at or below the level (160) of the fluid (152) in the fluid container (150). Continuing with this example, one or more capacitors may also be formed by the source electrode (104), the shield (760), and the dielectric space of the portion of the second molded carrier (503) that is at or below the level (160) of the fluid (152) in the fluid container (150). In addition, one or more capacitors may be formed by the source electrode (104), the shield (760), and the dielectric space of the fluid in the second fluid cavity (724).

Continuing with this example, one or more capacitors may be formed by the detect electrode (106), the shield (760), and the dielectric space of the portion of the first molded carrier (108) that is above the level (160) of the fluid (152) in the fluid container (150). Continuing with this example, one or more capacitors may also be formed by the detect electrode (106), the shield (760), and the dielectric space of the portion of the second molded carrier (503) that is above the level (160) of the fluid (152) in the fluid container (150). In addition, one or more capacitors may be formed by the detect electrode (106), the shield (760), and the dielectric space of the air (154) in the second fluid cavity (724). In this example, one or more capacitors may be formed by the detect electrode (106), the shield (760), and the dielectric space of the portion of the first molded carrier (108) that is at or below the level (160) of the fluid (152) in the fluid container (150). Continuing with this example, one or more capacitors may also be formed by the detect electrode (106), the shield (760), and the dielectric space of the portion of the second molded carrier (503) that is at or below the level (160) of the fluid (152) in the fluid container (150). In addition, one or more capacitors may be formed by the detect electrode (106), the shield (760), and the dielectric space of the fluid in the second fluid cavity (724).

For purposes of calculating equivalent capacitance of the various capacitors described above, the capacitors may be grouped into stacks of capacitors. For example, a second set of stacked capacitors may include a first stack and a second stack of series capacitors. In this example, the first stack may include the capacitors that are formed by the source electrode (104), the shield (760), and the dielectric spaces between the source electrode (104) and the shield (760) that are above the level (160) of the fluid (152) in the fluid container (150), which include the air (154) in the second fluid cavity (724) and some portions of the two carriers (108, 503). A second stack may include the capacitors that are formed by the source electrode (104), the shield (760), and the dielectric spaces between the source electrode (104) and the shield (760) that are at or below the level (160) of the fluid (152) in the fluid container (150), which include the fluid (152) in the second fluid cavity (724) and some portions of the two carriers (108, 503).

As another example, a third set of stacked capacitors may include a first stack and a second stack of series capacitors. In this example, the first stack may include the capacitors that are formed by the detect electrode (106), the shield (760), and the dielectric spaces between the detect electrode (106) and the shield (760) that are above the level (160) of the fluid (152) in the fluid container (150), which include the air (154) in the second fluid cavity (724) and some portions of the two carriers (108, 503). A second stack may include the capacitors that are formed by the detect electrode (106), the shield (760), and the dielectric spaces between the detect electrode (106) and the shield (760) that are at or below the level (160) of the fluid (152) in the fluid container (150), which include the fluid (152) in the second fluid cavity (724) and some portions of the two carriers (108, 503).

As explained above in FIG. 1, if a stack of series capacitors includes both one or more capacitors formed by a dielectric space of a molded carrier and one or more capacitors formed by a dielectric space of a fluid cavity, because the capacitors added in series, the impact of changes in capacitance due to fluids of different dielectrics is minimized. The result is that a fluid level sensor that includes a metallic shield and stacks of series capacitors with dielectric spaces that include a fluid cavity is insensitive to the dielectric constant of the fluid to be sensed and has the advantage that prior knowledge of the fluid and its dielectric constant is not required.

In the example of FIG. 7, the total capacitance of the second stack of series capacitors and the total capacitance of the third stack of series capacitors both vary as a function of the level of the fluid within the second fluid cavity. In both examples of the stack of series capacitors, all the capacitors in a particular stack are in series with each other and for purposes of calculating equivalent capacitance are added as such. Because the stacks are on top of each other, the two stacks are in parallel with each other and for purposes of calculating equivalent capacitance are added as such.

Figure 8:
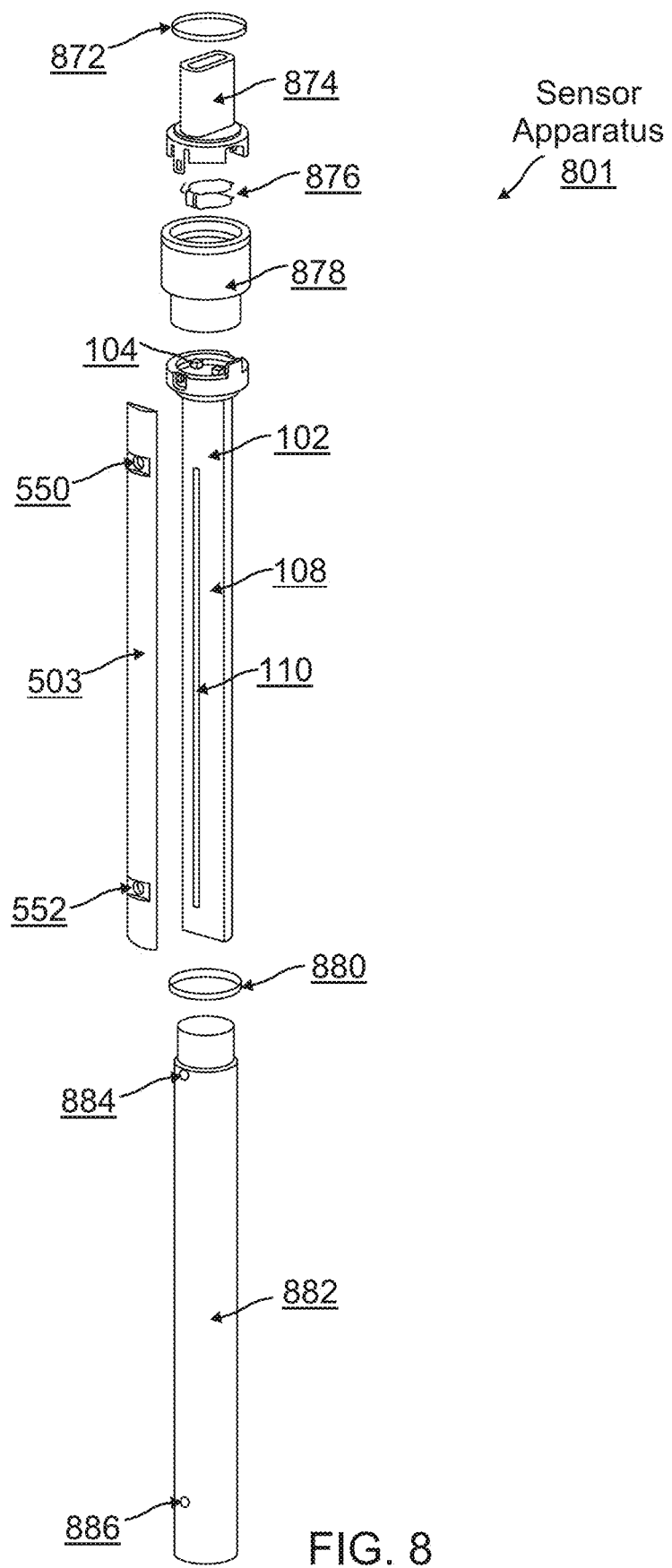
FIG. 8 depicts an isometric view of a disassembled sensor apparatus according to one embodiment of the present disclosure.

FIG. 8 depicts an isometric view of a disassembled sensor apparatus (801) according to one embodiment of the present disclosure. The sensor apparatus (801) of FIG. 8 includes the fluid level sensor (102) of FIG. 1 and the second molded carrier (503) of FIG. 5.

The sensor apparatus (801) also includes a metallic shield (882) for covering the first molded carrier (108) and the second molded carrier (503). In the example of FIG. 8, the metallic shield (882) also includes an upper via (884) and a lower via (886) that each create a hole through the metallic shield (882). When the metallic shield (882) is covering the second molded carrier (503) and the first molded carrier (108), the upper via (884) and the lower via (886) act as conduits for air and fluid to the first fluid cavity (110) and the second fluid cavity (724) through the upper via (550) and the lower via (552) of the second molded carrier (503). In a particular embodiment, the shapes and sizes of the one or more of the upper via (550) and the lower via (552) of the second molded carrier (503) and the upper via (884) and the lower via (886) of the metallic shield (776) may be optimized for mechanical filtering of the fluid level during dynamic environmental conditions. For example, the vias may be shaped and sized to reduce the effects of fluid sloshing on the level measurements.

The sensor apparatus (801) also includes an analog or digital capacitive application-specific integrated circuit (ASIC) and electronics module (876) to process the outputs of the electrodes (104, 106) of the fluid level sensor (102). In a particular embodiment, the ASIC and the electronics module (876) include signal processing circuitry coupled to the two electrodes (104, 106) for converting the capacitance values of any capacitors formed by the electrodes (104, 106) into electrical signals and processing the electrical signals to provide an output signal indicative of a level of the fluid (152) within the fluid container (150) relative to the fluid level sensor (102).

In the example of FIG. 8, the sensor apparatus (801) also includes an environmental seal (872) and a 3-pin USCAR 120 connector (874) that are coupled together along with the ASIC and electronic module (876) within a metallic housing (878). In a particular embodiment, the metallic housing (878) may accommodate an array of mounting techniques. Examples of mounting techniques include threaded, bracketed, grommeted, quarter-turn, and others as will occur to those of skill in the art. The sensor apparatus (801) includes a seal (880) for the connection between the metallic housing (878) and the sensor apparatus (601).

Figure 9:
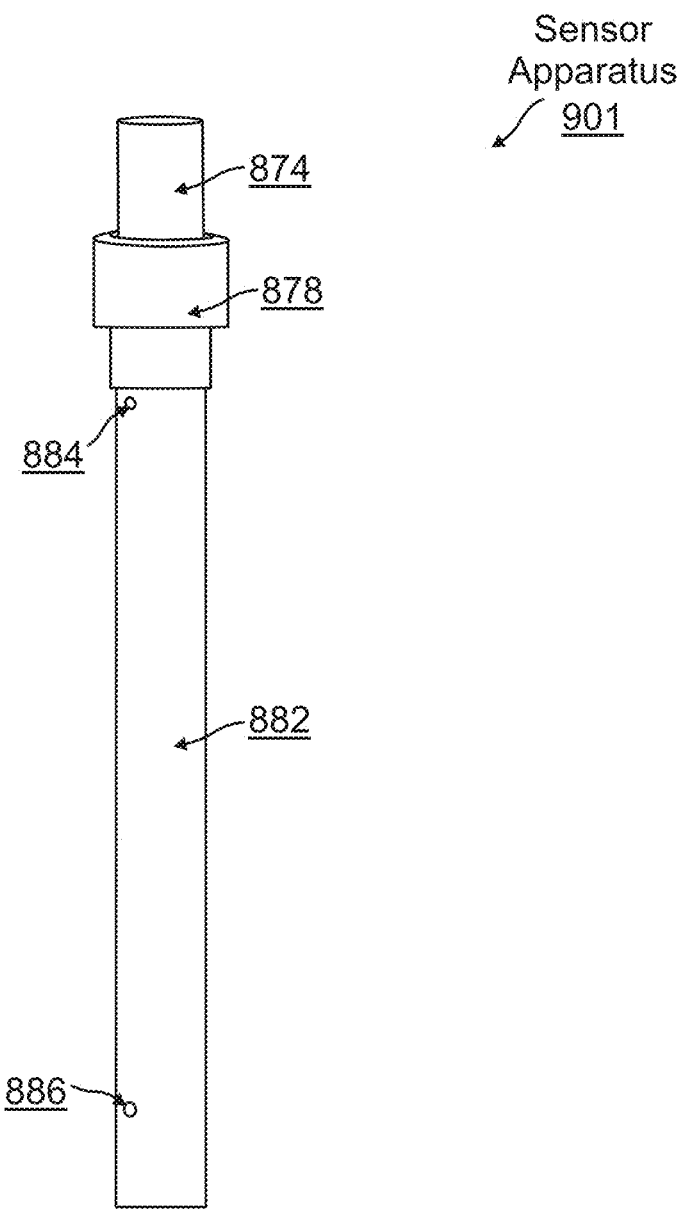
FIG. 9 depicts an isometric view of a sensor apparatus according to one embodiment of the present disclosure.

FIG. 9 depicts an isometric view of a sensor apparatus (901) according to one embodiment of the present disclosure. In a particular embodiment, the sensor apparatus (901) is an assembled configuration of the sensor apparatus (801) of FIG. 8. In the example of FIG. 9, the metallic shield (882) covers the fluid level sensor (102) and the second molded carrier (503).

As explained in FIG. 8, the metallic shield includes the upper via (884) and the lower via (886) which create holes through the metallic shield (882). When the metallic shield (882) is covering the second molded carrier (503) and the first molded carrier (108), the upper via (884) and the lower via (886) act as conduits for air and fluid to the first fluid cavity (110) and the second fluid cavity (724) through the upper via (550) and the lower via (552) of the second molded carrier (503).

In a particular embodiment, the sensor apparatus (901) acts as a fluid level sensor for directly inserting into a fluid within a fluid container, such as the fluid container (150) of FIG. 1. According to embodiments of the present invention, the fluid level sensor is insensitive to the dielectric constant of the fluid to be sensed and has the advantage that prior knowledge of the fluid and its dielectric constant is not required.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may be dependent from any or all claims in a multiple dependent manner even though such has not been originally claimed.

What is claimed is:

1. A dielectric-constant-insensitive fluid level sensor comprising:
    two coplanar electrodes;
    a first set of stacked series capacitors, each capacitor in the first set formed by the two coplanar electrodes and one of a plurality of dielectric spaces between the electrodes, each stack of series capacitors in the first set including at least one capacitor having a first molded carrier as the dielectric space in series with another capacitor having a first fluid cavity as the dielectric space, the total capacitance of the first set of stacked series capacitors varying as a function of the level of the fluid within the first fluid cavity;
    wherein the two coplanar electrodes are encased in the first molded carrier and separated from one another by some portion of the first molded carrier; wherein the portion of the first molded carrier between the two electrodes has a known dielectric constant value thereby forming with the two electrodes, a first set of one or more capacitors of fixed electrical capacitive values; and
    wherein the first fluid cavity is encased in the portion of the first molded carrier between the two electrodes and is open to receiving varying levels of the fluid within a fluid container thereby forming with the two electrodes and the fluid and any air within the first fluid cavity, a second set of one or more capacitors of variable electrical capacitive values.

2. The fluid level sensor of claim 1, wherein the first fluid cavity is completely encased in the portion of the first molded carrier except for one particular facet of the first fluid cavity that is substantially perpendicular to the level of the fluid in the fluid container upon the placement of the sensor within the fluid container; and
    wherein the one particular facet is exposed to the outside of the first molded carrier.

3. The fluid level sensor of claim 2 further comprising a second molded carrier that covers the particular facet of the first fluid cavity that is exposed to the outside of the first molded carrier.

4. The fluid level sensor of claim 3 further comprising a metallic shield that surrounds the first molded carrier and the second molded carrier; wherein the metallic shield reduces interference with the capacitors between the two electrodes from outside the metallic shield.

5. The fluid level sensor of claim 4 further comprising:
    a second set of stacked series capacitors formed by a first electrode of the two coplanar electrodes, the metallic shield, and a plurality of dielectric spaces between a first electrode and the metallic shield, the plurality of dielectric spaces between the first electrode and the metallic shield including the first molded carrier and a second fluid cavity; and
    a third set of stacked series capacitors formed by a second electrode of the two coplanar electrodes, the metallic shield, and a plurality of dielectric spaces between the second electrode and the metallic shield, the plurality of dielectric spaces between the second electrode and the metallic shield including the first molded carrier and the second fluid cavity;
    wherein the total capacitance of the second stack of series capacitors and the total capacitance of the third stack of series capacitors both vary as a function of the level of the fluid within the second fluid cavity.

6. The fluid level sensor of claim 5 wherein the second fluid cavity includes any space between the metallic shield and the first molded carrier and any space between the metallic shield and the second molded carrier;
    wherein the second fluid cavity forms with each of the electrodes, the metallic shield, and any fluid and air within the second fluid cavity, one or more capacitors of variable electrical capacitive values; and
    wherein the second molded carrier and the portion of the first molded carrier outside of the space between the two electrodes forms with each of the electrodes and the metallic shield, one or more capacitors of fixed electrical capacitive values.

7. The fluid level sensor of claim 4, wherein the metallic shield and the second molded carrier, each include one or more vias for the fluid within the fluid container to pass between the second molded carrier and the metallic shield and into the first fluid cavity.

8. The fluid level sensor of claim 1, wherein the volume of the second fluid cavity is smaller than the combination of the volume of the portion of the first molded carrier outside of the space between the two electrodes and the volume of the second molded carrier.

9. The fluid level sensor of claim 1 further comprising signal processing circuitry coupled to the two electrodes for converting the capacitance values of any capacitors formed by the electrodes into electrical signals and processing the electrical signals to provide an output signal indicative of a level of the fluid within the fluid container relative to the sensor.

10. A dielectric-constant-insensitive fluid level sensor comprising:
a first set of stacked series capacitors, each capacitor in the first set formed by a metallic shield, a first electrode, and one of a first plurality of dielectric spaces between the first electrode and the metallic shield, each stack of series capacitors in the first set including at least one capacitor having a first fluid cavity as the dielectric space and another capacitor having as the dielectric space, one or more molded carriers encased by the metallic shield; and
a second set of stacked series capacitors, each capacitor in the second set formed by the metallic shield, a second electrode, and one of a second plurality of dielectric spaces between the second electrode and the metallic shield, each stack of series capacitors in the second set including at least one capacitor having the first fluid cavity as the dielectric space and another capacitor having as the dielectric space, the one or more molded carriers encased by the metallic shield; and
wherein the total capacitance of the first stack of series capacitors and the total capacitance of the second stack of series capacitors both vary as a function of the level of the fluid within the first fluid cavity.

11. The fluid level sensor of claim 10 wherein the first fluid cavity includes any space between the metallic shield and the one or more molded carriers;
wherein the first fluid cavity forms with each of the electrodes, the metallic shield, and any fluid and air within the first fluid cavity, one or more capacitors of variable electrical capacitive values;
wherein the one or more carriers have known dielectric constant values; and
wherein the portions of the one or more carriers outside of the space between the two electrodes forms with each of the electrodes and the metallic shield, one or more capacitors of fixed electrical capacitive values.

12. The fluid level sensor of claim 10 further comprising a third set of stacked series capacitors formed by the two coplanar electrodes and a third plurality of dielectric spaces between the electrodes, the third plurality of dielectric spaces including a first molded carrier and a second fluid cavity, the total capacitance of the third set of stacked series capacitors varying as a function of the level of the fluid within the second fluid cavity.

13. The fluid level sensor of claim 12, wherein the two coplanar electrodes are encased in the first molded carrier and separated from one another by some portion of the first molded carrier; wherein the portion of the first molded carrier between the two electrodes has a known dielectric constant value thereby forming with the two electrodes, a first set of one or more capacitors of fixed electrical capacitive values; and
wherein the second fluid cavity is encased in the portion of the first molded carrier between the two electrodes, wherein the first fluid cavity is open to receiving varying levels of the fluid within a fluid container thereby forming with the two electrodes and the fluid and any air within the second fluid cavity, a second set of one or more capacitors of variable electrical capacitive values.

14. The fluid level sensor of claim 13, wherein the second fluid cavity is completely encased in the portion of the first molded carrier except for one particular facet of the second fluid cavity that is substantially perpendicular to the level of the fluid in the fluid container upon the placement of the sensor within the fluid container; and
wherein the one particular facet is exposed to the outside of the first molded carrier.

15. The fluid level sensor of claim 14 further comprising a second molded carrier that covers the particular facet of the second fluid cavity that is exposed to the outside of the first molded carrier.

16. The fluid level sensor of claim 15 wherein the metallic shield reduces interference with the capacitors between the two electrodes from outside the metallic shield.

17. The fluid level sensor of claim 15, wherein the metallic shield and the second molded carrier, each include one or more vias for the fluid within the fluid container to pass between the second molded carrier and the metallic shield and into the second fluid cavity.

18. The fluid level sensor of claim 15, wherein the volume of the first fluid cavity is smaller than the combination of the volume of the second molded carrier and the volume of the portion of the first molded carrier outside of the space between the two electrodes.

19. The fluid level sensor of claim 15 further comprising signal processing circuitry coupled to the two electrodes for converting the capacitance values of any capacitors formed by the electrodes into electrical signals and processing the electrical signals to provide an output signal indicative of a level of the fluid within the fluid container relative to the sensor.

* * * * *